United States Patent [19]

Rody

[11] 4,294,963
[45] Oct. 13, 1981

[54] POLYALKYLPIPERIDINE DERIVATIVES OF S-TRIAZINE

[75] Inventor: Jean Rody, Riehen, Switzerland

[73] Assignee: Ciba-Geigy Corporation, Ardsley, N.Y.

[21] Appl. No.: 57,673

[22] Filed: Jul. 16, 1979

Related U.S. Application Data

[63] Continuation-in-part of Ser. No. 8,135, Jan. 31, 1979, abandoned.

[30] Foreign Application Priority Data

Feb. 8, 1978 [CH] Switzerland .................. 1402/78

[51] Int. Cl.$^3$ .................. C07D 401/12; C07D 401/14
[52] U.S. Cl. .................. 544/198; 544/113; 544/212; 544/209; 542/417; 260/45.8 NT
[58] Field of Search .................. 544/198, 209, 212, 113

[56] References Cited

U.S. PATENT DOCUMENTS

| | | | |
|---|---|---|---|
| 3,925,376 | 12/1975 | Chalmers et al. | 544/198 |
| 4,028,334 | 6/1977 | Chalmers et al. | 544/198 |
| 4,086,204 | 4/1978 | Cassandrini et al. | 544/198 |
| 4,108,829 | 8/1978 | Cassandrini et al. | 544/198 |

FOREIGN PATENT DOCUMENTS

| | | |
|---|---|---|
| 2730449 | 1/1978 | Fed. Rep. of Germany . |
| 2752740 | 6/1978 | Fed. Rep. of Germany . |
| 2372187 | 6/1978 | France . |
| 2357559 | 2/1979 | France . |

*Primary Examiner*—John M. Ford
*Attorney, Agent, or Firm*—Wenderoth, Lind & Ponack

[57] ABSTRACT

Polyalkylpiperidine derivatives which are unsubstituted in the 1-position of the piperidine ring and in the 4-position are bonded through a heteroatom bridge to an s-triazine radical, can be converted by reaction with a dihalide or a di-, tri- or tetraepoxide into compounds of the formula I

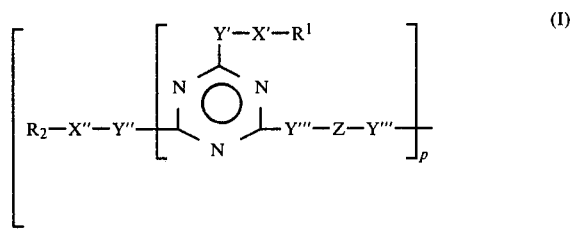

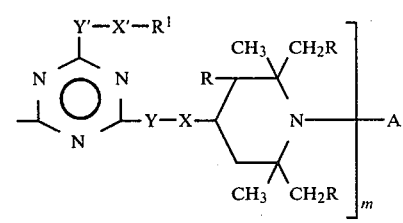

wherein n is 2, 3 or 4 and p is 0 or 1. Polymer or oligomer compounds of the formula II

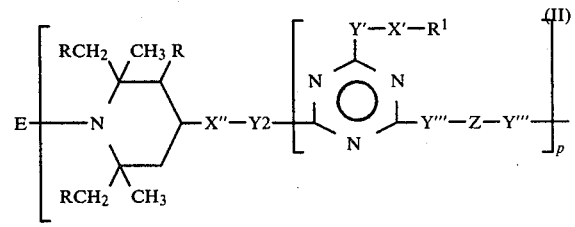

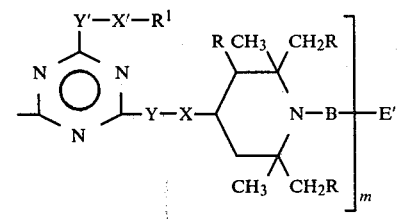

wherein n represents the degree of polymerization and E and E' represent end groups, are obtained by reacting a triazine derivative which contains at least two polyalkylpiperidine substituents with dihalides or diepoxides.

Both types of compound are stabilizers for polymers, especially against damage by light. They are distinguished by low volatility and a low tendency to migrate, so that they are of special interest for use in thin polymer layers, for example in fibres, sheets or coatings.

5 Claims, No Drawings

POLYALKYLPIPERIDINE DERIVATIVES OF S-TRIAZINE

This application is a continuation-in-part application of co-pending application Ser. No. 8135 filed Jan. 31, 1979 (now abandoned).

The invention relates to new polyalkylpiperidine derivatives of s-triazines and their use as stabilisers for polymers. These derivatives are compounds of the formula I or II

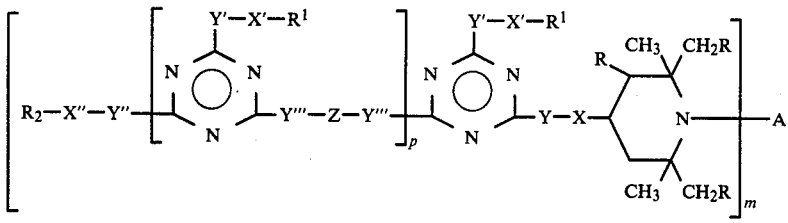

(I)

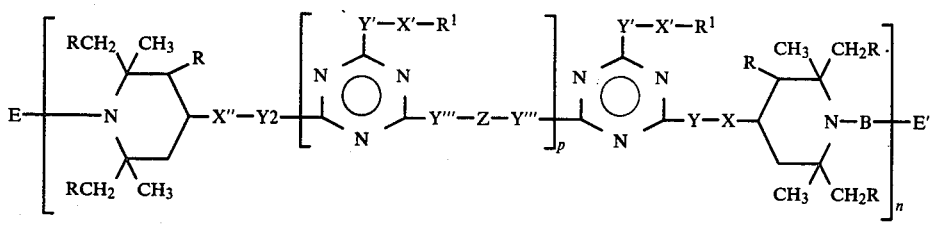

(II)

wherein m is 2, 3 or 4, n is 2 to 50, p is 0 or 1, X, X' and X" represent a direct bond, $C_1$-$C_4$alkylene or —OCH$_2$CH$_2$CH$_2$—, the O of which is not bonded to Y, Y' or Y'''; Y, Y', Y''' and Y'''' represent —O—, —S—, —NH— or —NR$^3$—, Z represents $C_2$-$C_{12}$alkylene, $C_4$-$C_{20}$alkylene interrupted by —O—, —S—, —NH— or —NR$^3$—, xylylene, $C_6$-$C_{12}$arylene or -phenylene-Q'-phenylene-, wherein Q' is —CH$_2$—, >C(CH$_3$)$_2$, —SO$_2$— or —O—, R represents hydrogen or $C_1$-$C_4$alkyl, R$^1$, R$^2$ and R$^3$ represent $C_1$-$C_{12}$alkyl, $C_2$-$C_8$alkoxyalkyl, $C_2$-$C_4$hydroxyalkyl, $C_5$-$C_{12}$cycloalkyl, $C_7$-$C_{12}$aralkyl, $C_3$-$C_{18}$alkenyl, $C_6$-$C_{10}$aryl, phenyl which is substituted by one or two $C_1$-$C_8$alkyl groups and/or by OH and/or by $C_1$-$C_4$alkoxy, or represent a polyalkylpiperidinyl group of the formula III

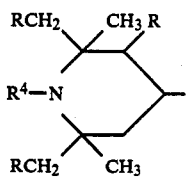

III or, if Y' or Y'' is —NR$^3$— and X' or X'' is a direct bond, R$^1$ and R$^2$ together with the nitrogen atom form a pyrrolidone, piperidine or morpholine ring, R$^4$ represents hydrogen, O·, $C_1$-$C_{12}$alkyl, allyl or benzyl, A if m is 2, represents $C_2$-$C_{12}$alkylene, $C_4$-$C_8$alkylene, xylylene or a radical of the formula —CH$_2$—C≡C—CH$_2$—,

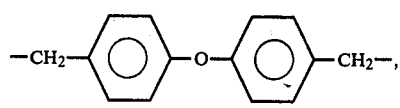

—CH$_2$—COO-R$^5$—OOC—CH$_2$, —CH$_2$—CH(OH)—CH$_2$— or —CH$_2$CH(OH)CH$_2$—D—CH$_2$CH(OH)CH$_2$—, or if m is 3, represents a group of the formula

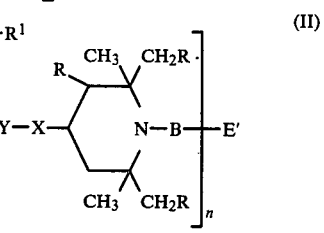

and, if m is 4, represents a group of the formula

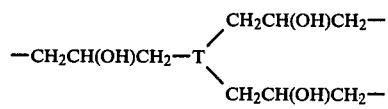

B represents $C_2$-$C_{12}$alkylene, $C_4$-$C_8$alkenylene, xylylene or a radical of the formula —CH$_2$—COO—R$^5$—OOC—CH$_2$—, —CH$_2$—CH(OH)—CH$_2$ or —CH$_2$CH(OH)CH$_2$—D—CH$_2$CH(OH)CH$_2$, R$^5$ represents $C_2$-$C_8$alkylene, $C_4$—$C_8$oxaalkylene or cyclohexylene, D represents a divalent radical of the formula —O—R$^6$—O—, —O—C(O)—R$^7$—C(O)—O—, —OCH(R$^8$)CH$_2$O—R$^6$—OCH$_2$CH(R$^8$)O— or

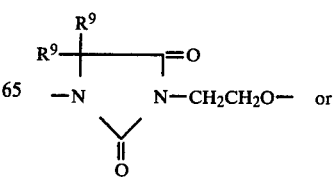

-continued

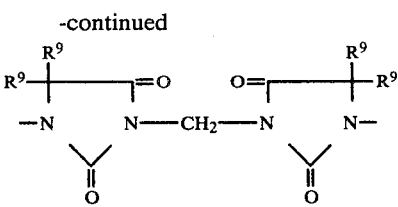

$R^6$ represents $C_2$-$C_{12}$alkylene, $C_6$-$C_{12}$cycloalkylene, $C_6$-$C_{12}$arylene or -phenylene-$Z_1$-phenylene-, wherein $Z_1$ represents —$CH_2$—, >$C(CH_3)_2$, —$SO_2$— or —O—, $R^7$ represents a direct bond, $C_1$-$C_{12}$alkylene, $C_2$-$C_6$alkenylene, $C_6$-$C_{12}$cycloalkylene or cycloalkenylene or $C_6$-$C_{12}$arylene, $R^8$ and $R^9$ are hydrogen or $C_1$-$C_4$alkyl, T represents a trivalent radical of the formulae

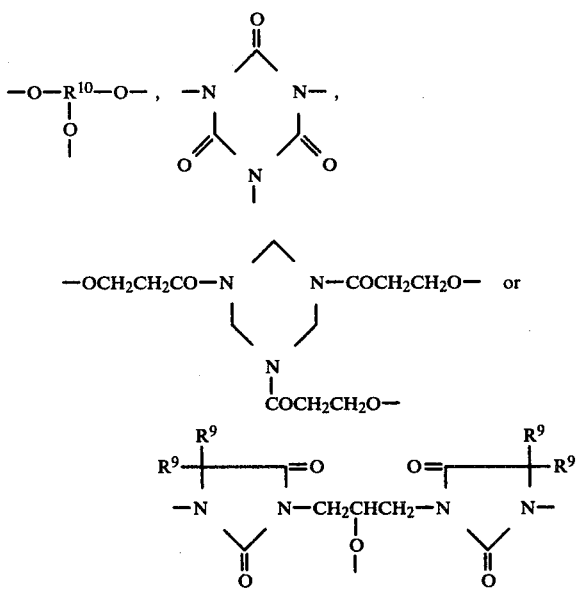

$R^{10}$ represents a trivalent aliphatic hydrocarbon radical of 3 to 10 carbon atoms, Q represents a quadrivalent radical of the formula

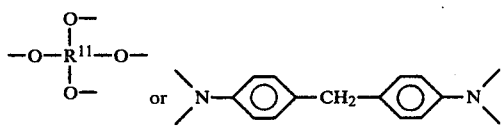

$R^{11}$ represents a quadrivalent aliphatic hydrocarbon radical of 4 to 10 carbon atoms, and E and E' represent end groups.

$R^4$ as $C_1$-$C_{12}$alkyl can be a branched or unbranched alkyl radical, for example methyl, ethyol, isopropyl, tert-butyl, hexyl, isooctyl, decyl or dodecyl. $R^1$, $R^2$ and $R^3$ can in addition also represent higher alkyl radicals, for example tetradecyl, hexadecyl or octadecyl.

$R^1$, $R^2$ and $R^3$ as alkoxyalkyl can be for example methoxymethyl, 2-methoxyethyl, 2-ethoxyethyl, 2-isopropoxyethyl, 2-n-butoxyethyl, sec- or tert-butoxyethyl or 2-butoxypropyl.

$R^1$, $R^2$ and $R^3$ as hydroxyalkyl can be for example 2-hydroxyethyl, 2-hydroxypropyl, 2-hydroxybutyl or 3-hydroxypropyl.

$R^1$, $R^2$ and $R^3$ as $C_5$-$C_{12}$ cycloalkyl can be for example cyclopentyl, cyclohexyl, 3-methylcyclohexyl or 4-tert-butyl-cyclohexyl or cyclododecyl.

$R^1$, $R^2$ and $R^3$ as $C_6$-$C_{10}$aryl can be phenyl or naphthyl, preferably phenyl.

$R^1$, $R^2$ and $R^3$ as aralkyl can be for example benzyl, phenylethyl, phenylbutyl or naphthylmethyl.

$R^1$, $R^2$ and $R^3$ as alkenyl can be for example allyl, methallyl, hexenyl or oleyl.

$R^1$, $R^2$, and $R^3$ as substituted phenyl can be for example p-tolyl, 4-hydroxyphenyl, 4-tert-butylphenyl or 3,5-di-tert-butyl-4-hydroxyphenyl.

X as $C_1$-$C_4$alkylene can be for example methylene, ethylene, 1,3-propylene, 1,2-propylene, 1,1-dimethylethylene or 2,2-propylene.

A, B, Z or $R^6$ as alkylene can be a branched or unbranched alkylene group, for example ethylene, tri-, tetra-, hexa-, octa- deca- or dodecamethylene, 2,2-dimethylpropylene-1,3, 1,2-butylene or 1,2-propylene. $R^5$ is a divalent aliphatic or cycloaliphatic radical, for example ethylene, 1,2-propylene, 1,2-butylene, 1,3-propylene, 1,4-butylene, 1,6-hexylene 1,4-cyclohexylene or 3-oxapentylene-1,5.

A and B as alkenylene can be for example 1,4-buten-2-ylene or 1,6-hexen-3-ylene.

$R^6$ as cycloalkylene can be for example 1,4-cyclohexylene or 1,4-cyclooctylene. $R^6$ or Z as arylene can be phenylene, naphthylene or diphenylene.

$R^7$ as alkylene or alkenylene can be for example methylene, 1,3-propylene, tetramethylene, 2,2-dimethyl-1,3-propylene, octamethylene, dodecamethylene, vinylene or 1,4-buten-2-ylene. $R^7$ as cyclic radical can be for example 1,2-cyclopentylene, 1,2-cyclohexylene, 1,2-cyclohexen-4-ylene, 3,6-endomethylenecyclohexen-4-ylene-1,2, 1,2-phenylene, 1,4-phenylene or 1,4-naphthylene.

Simple polyalkylpiperidine derivatives of s-triazines of the formula IV

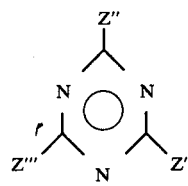

wherein at least one of the substituents Z', Z" and Z'" is a polyalkylpiperidine group which is bonded to the triazine radical through O, S or N, are known from German Offenlegungsschrift No. 2,319,816. These known polyalkylpiperidine derivatives of s-triazines are excellent light protectants for polymers. However, for specific end-use requirements the volatility and tendency of these known compounds to migrate are too great for technical use. This is so if the polymers are used in thin layers, for example in fibres, fibre ribbons, sheets or coatings, and a stabilising is required over a prolonged period of time. It has been found that the new polyalkylpiperidine derivatives of s-triazines defined above possess a substantially lower volatility and tendency to migrate, so that they also have a long-term stabilising action in polymers of low thickness.

Preferred compounds are those of the formula I or II, wherein R is hydrogen. These compounds are derivatives of 2,2,6,6-tetramethylpiperidine. Preferred compounds are also those of the formula I or II wherein Y, Y', Y" and Y'" represent —O—, —NH—, —NR$_3$—, especially wherein Y, Y', Y" and Y'" represent —NH— or —NR$_3$—.

Preferred compounds are also those of the formula I or II wherein A or B represents a divalent radical of the formula —CH$_2$CH(OH)CH$_2$—D—CH$_2$CH(OH)CH$_2$—, in particular a divalent radical of the formula —CH$_2$CH(OH)CH$_2$—O—R$^6$—O—CH$_2$CH(OH)CH$_2$—.

The compounds of the formula I, in which m is 2, can be prepared by reaction of 2 moles of a compound of the formula V

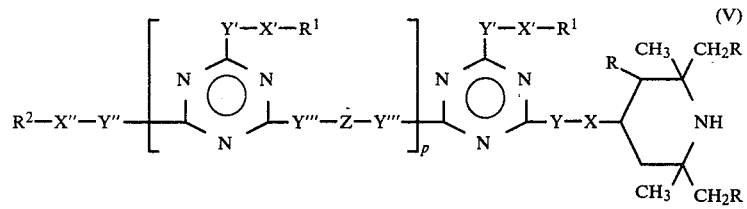

with 1 mole of a dihalogeno compound AHal$_2$ (Hal=Cl or Br) or of a bisepoxide of the formula VI

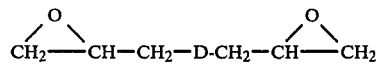

or with 1 mole of epichlorohydrin.

The reactions with dihalide or epichlorohydrin are carried out in the presence of equivalent amounts of alkali, ammonia or of an amine, with respect to the amount of halide, preferably in the presence of tertiary amines. The reaction with epichlorohydrin can be carried out in a first stage without the addition of a base and in a second stage with the addition of a base. The reactions can be carried out in organic solvents or without solvents.

Suitable dihalides AHal$_2$ are for example 1,4-dibromobutane, 1,8-dibromooctane, 1,6-dichlorohexane, 1,4-dichlorobutene-2, 1,4-dichlorobutene, m- or p-xylylene dichloride, 4,4'-di-(chloromethyl)-diphenyl, ethylene glycol di(chloroacetate) or butanediol-1,4-di(chloroacetate).

Suitable bisepoxides are for example butanediol-1,4-diglycidyl ether, diglycidyl ethers of bisphenol A, diglycidyl tetrahydrophthalate, diglycidyl trimethyladipate, diglycidyl terephthalate 1-glycidyl-3-glycidyloxyethyl-5,5-dimethylhydantoin, or 1,1'-diglycidyl-3,3'-methylene-bis-5,5-dimethylhydantoin.

The triazine derivatives of the formula V used as starting materials are described in German Offenlegungsschrift No. 2,319,816. They can be prepared by stepwise reaction of cyanuric chloride with the compounds R$^1$-X'-Y"H and R$^2$-X"-Y"H and a 4-hydroxy- or 4-amino-polyalkylpiperidine.

Compounds of the formula I, wherein m is 3 or 4, can be obtained by reaction of 3 moles or 4 moles of a compound of the formula V with 1 mole of a trisepoxide of the formula VII

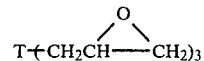

or of a tetraepoxide of the formula VIII

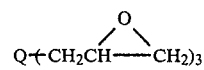

Examples of such tris- and tetra-epoxides are: triglycidyl ethers of trimethylolpropane, triglycidyl isocyanurate, 1,3,5-tris-(β-glycidyloxy-propionyl)-hexahydro-s-triazine, tetraglycidyl ethers of pentaerythritol or N,N,N',N'-tetra-(glycidyl)-4,4'-diaminodiphenylmethane.

To obtain compounds of the formula II, a start is made from a compound of the formula V, in which R$^2$ is a polyalkylpiperidine radical of the formula III, wherein R$^4$ is hydrogen. Reaction of such a compound with a dihalide AHal$_2$ or a bis-epoxide of the formula VI in the approximate molar ratio of 1:1 yields polymers or oligomers of the formula II. A mixture of bisepoxides can also be used in this reaction. The symbol n represents the average degree of polymerisation and can have a value from 2 to 50.

The value of n depends on the purity of the reaction components and on the reaction conditions (time, temperature, molar ratio). Oligomer compounds having a degree of polymerisation n from 2 to about 10 are preferred.

The end groups E are hydrogen, if this latter is not substituted by an aftertreatment. The end groups E' are the reactive groups of the second component, namely halogen or epoxide, or a reaction product of such a group. The reaction of the reactive end groups E' can be effected spontaneously by secondary reactions, such as dehydrohalogenation or hydrolysis, or the product is subjected to an aftertreatment in which the end group is converted, for example an alcoholysis or an aminolysis. Such an aftertreatment can have the purpose, for example, of keeping the degree of polymerisation n low or of making the polymer product more stable. Such subsequent reactions are known in macromolecular chemistry as end group blocking.

A restriction of the degree of polymerisation n can however also be achieved by using an excess of one of the two reactants. This method yields products which have substantially identical end groups. For example, an excess of the dihalide or bisepoxide yields predominantly compounds of the formula II, in which E represents a group -B-E'.

During the manufacture of these polymer compounds of the formula II, branched, cyclised or crosslinked polymers can also be formed. Branchings of the crosslinkings are possible especially when using compounds of the formula V, in which both R$^2$ and R$^1$ represent a polyalkylpiperidine group. Such by-products do not need to be isolated from the reaction mixture, as they can also be used as stabilisers.

The compounds of the formula I or II can be used as stabilisers for polymers and in particular they are distinguished by an outstanding light protective action. Examples of polymers which are normally damaged by the action of light and can be stabilised by addition of compounds of the formula I or II are:

1. Polymers of mono- and diolefins, for example polyethylene (which may or may not be crosslinked), polypropylene, polyisobutylene, polymethylbutene-1, polymethylpentene-1, polyisoprene or polybutadiene.

2. Mixtures of the polymers listed in 1), for example mixtures of polypropylene with polyethylene or with polyisobutylene.

3. Copolymers of mono- and diolefins, for example ethylene-propylene copolymers, propylene-butene-1 copolymers, propylene-isobutylene copolymers, ethylene-butene-1 copolymers, and also terpolymers of ethylene with propylene and a diene, such as hexadiene, dicyclopentadiene or ethylidene norboxnene.

4. Polystyrene.

5. Copolymers of styrene or α-methylstyrene with dienes or acrylic derivatives, for example styrene-butadiene, styrene-acrylonitrile, styrene-acrylonitrile-methacrylate; mixtures of high impact strength of styrene copolymers and another polymer, for example a polyacrylate, a diene polymer or an ethylene-propylene-diene terpolymer; and block copolymers of styrene, for example styrene-butadiene-styrene, styrene-isoprene-styrene or styrene-ethylene/butylene-styrene.

6. Graft copolymers of styrene, for example styrene to polybutadiene, styrene and acrylonitrile to polybutadiene as well as the mixtures thereof with the copolymers listed in 5) known as ABS polymers.

7. Halogen-containing polymers, for example polyvinyl chloride, polyvinylidene chloride, polyvinyl fluoride, polychloroprene, chlorinated rubber and copolymers, such as vinyl chloride-vinylidene chloride, vinyl chloride-vinyl acetate or vinylidene chloride-vinyl acetate.

8. Polymers which are derived from α, β-unsaturated acids and their derivatives, such as polyacrylates and polymethacrylates, polyacrylamides and polyacrylonitrile.

9. Polymers which are derived from unsaturated alcohols and amines and their acyl derivatives or acetals, such as polyvinyl alcohol, polyvinyl acetate, stearate, benzoate and maleate, polyvinylbutyral, polyallyl phthalate, polyallyl melamine and their copolymers with other vinyl compounds, such as ethylene/vinyl acetate copolymers.

10. Homo- and copolymers of epoxides, such as polyethylene oxide, polypropylene oxide or their copolymers with bisglycidyl ethers.

11. Polyacetals, such as polyoxymethylene and those polyoxymethylenes which contain ethylene oxide as comonomer.

12. Polyphenylene oxides.

13. Polyurethanes and polyureas.

14. Polycarbonates.

15. Polysulphones.

16. Polyamides and copolyamides which are derived from diamines and dicarboxylic acids and/or from aminocarboxylic acids or the corresponding lactames, such as polyamide 6, polyamide 6/6, polyamide 6/10, polyamide 11, polyamide 12.

17. Polyesters which are derived from dicarboxylic acids and dialcohols and/or from hydroxycarboxylic acids or the corresponding lactones, such as polyethylene terephthalate, polybutylene phthalate, poly-1,4-dimethylol-cyclohexane-terephthalate, and block polyether esters which are derived from polyethers with hydroxyl end groups and dicarboxylic acids.

18. Crosslinked polymers which are derived from aldehydes on the one hand and from phenols, ureas and melamines on the other, such as phenol-formaldehyde, urea-formaldehyde and melamine-formaldehyde resins.

19. Alkyd resins, such as glycerol-phthalic acid resins and their mixtures with melamine-formaldehyde resins.

20. Unsaturated polyester resins, which are derived from copolyesters of saturated and unsaturated dicarboxylic acids with polyvalent alcohols, as well as vinyl compounds as crosslinking agents, and also their flame-resistant modifications which contain halogen.

21. Crosslinked epoxide resins which are derived from polyepoxides, for example from bis-glycidyl ethers or from cycloaliphatic diepoxides.

22. Natural polymers, such as cellulose, rubber, and their chemically modified polymer homologous derivatives, such as cellulose acetates, propionates and butyrates, or the cellulose ethers, such as methyl cellulose.

Of these polymers, those belonging to groups 1-6, 13, 16 and 17 are to be singled out for special mention, as the stabilisers of the invention have a particularly marked action in these substrates. Furthermore, polymers which are used as coating resins are of particular importance.

The stabilisers of the formula I or II are incorporated in the substrates in a concentration of 0.005 to 5% by weight, based on the material to be stabilised.

Preferably 0.01 to 1% by weight, most preferably 0.02 to 0.5% by weight of the compounds, based on the material to be stabilised, is incorporated thereinto. Incorporation can be effected for example by blending in at least one of the stabilisers of the invention and optionally further additives by methods conventionally employed in the art, before or during the moulding, or also by applying the dissolved or dispersed compounds to the polymer, optionally with subsequent evaporation of the solvent.

The stabilised plastics can furthermore contain other stabilisers or other additives conventionally employed in plastics technology, for example those listed in German Offenlegungsschrift No. 2,349,962, pages 25-32.

When using known stabilisers concurrently, synergistic effects occur. This happens frequently when other light protective agents or organic phosphites are used.

The concurrent use of antioxidants in the stabilising of polyolefins is of especial importance.

Accordingly, the invention also relates to the plastics stabilised by addition of 0.01 to 5% by weight of a compound of the formula I, which can contain additional known and conventional additives. The stabilised plastics can be used in a very wide variety of different forms, for example as sheets, fibres, ribbons, profiles or as binders for lacquers, adhesives or putty.

The use in thin layers in the form of fibres, sheets and coatings is of particular importance.

The following Examples describe the production and use of the compounds of the invention in more detail. Parts and percentages are by weight.

EXAMPLE 1

With stirring, 28.5 g of 2,4,6-tris-(2',2',6',6'-tetramethylpiperidinyl-4'-butylamino)-1,3,5-triazine (m.p. 165° C.) are heated with 4 g of 1,4-butanediol diglycidyl ether in 100 ml of n-octanol for 10 hours to 160° C. The solvent is then completely distilled off, firstly under a water jet vacuum and then in a high vacuum (0.001 torr) at 150° C., affording a slightly yellowish solid resin, which can be pulverised to a colourless powder having a melting point of about 105° C.

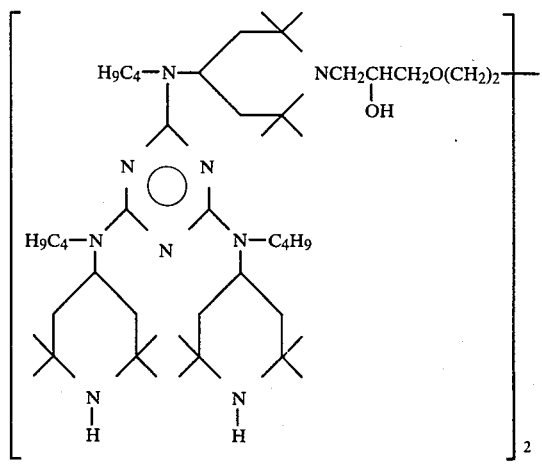

EXAMPLE 2

The adduct of the following formula

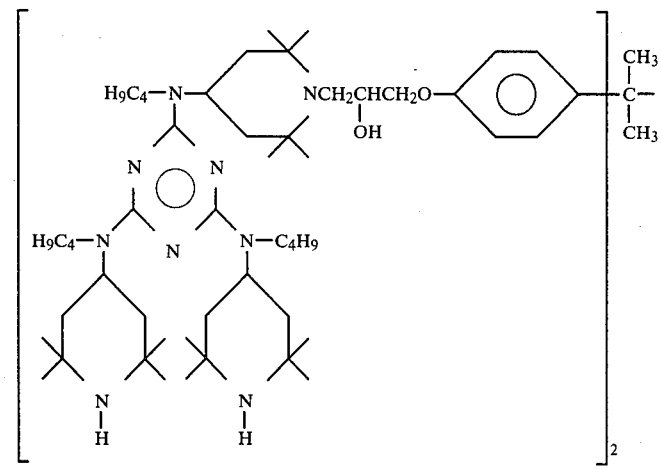

is obtained as a white powder with a melting point of about 130° C. by repeating the procedure described in Example 1 using 6.8 g of bisphenol-A diglycidyl ether instead of 4 g of 1,4-butanediol diglycidyl ether.

EXAMPLE 3

With stirring, 28.5 g of 2,4,6-tris-(2',2',6',6'-tetramethylpiperidinyl-4'-butylamino)-1,3,5-triazine (m.p. 165° C.) are heated with 8 g of 1,4-butanediol diglycidyl ether in 100 ml of octanol for 10 hours to 160° C. The solvent is then completely distilled off in vacuo (up to 0.001 torr) at 150°–160° C. The resulting polyadduct resin is a yellowish resin, which, after cooling, can be pulverised to a colourless powder with a sintering point of about 134° C. and an average molecular weight of about 4100. (Vapour pressure osmometry).

EXAMPLE 4

A polyadduct of the following formula

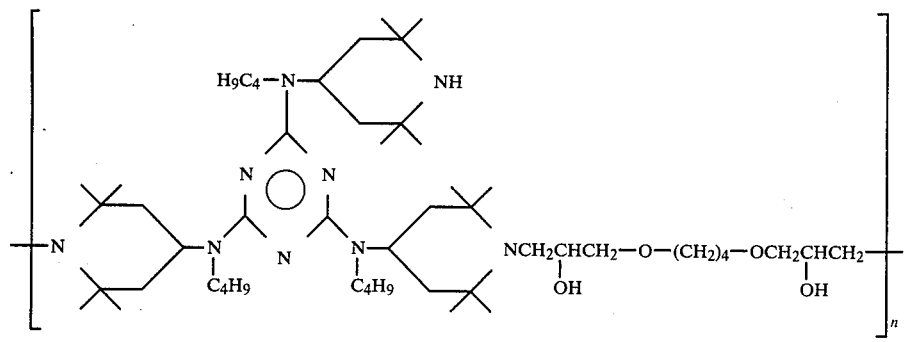

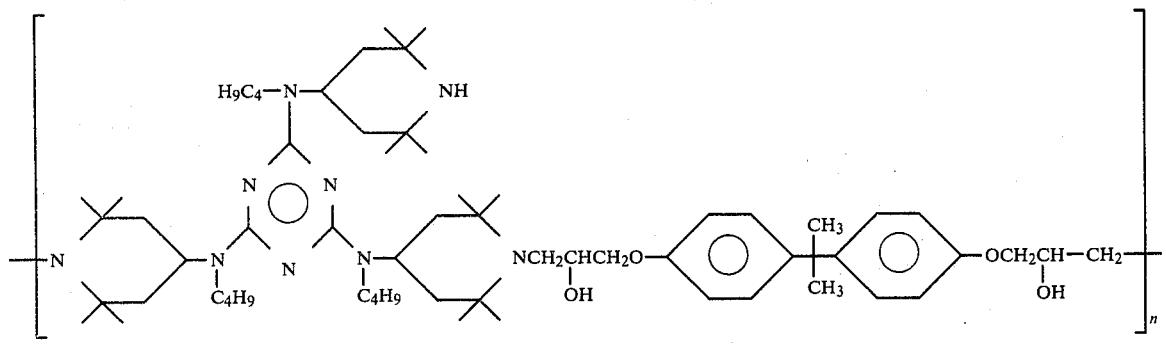

with a sintering point of about 132° C. and an average molecular weight of about 3500 is obtained by repeating the procedure described in Example 3 using 13.6 g of bisphenyl-A biglycidyl ether instead of 8 g of 1,4-butanediol diglycidyl ether.

EXAMPLE 5

A polyadduct of the formula

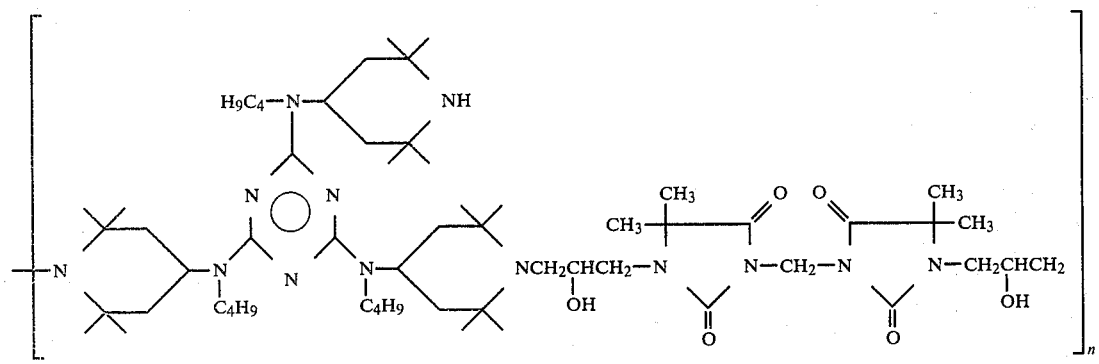

is obtained in the form of a colourless powder with a softening point of about 205° C. and an average molecular weight of 2600 (vapour pressure osmometry) by repeating the procedure described in Example 3, but using 15.2 g of 1,1'-diglycidyl-3,3'-methylene-bis-5,5-dimethylhydantoin instead of 8 g of 1,4-butanediol diglycidyl ether.

EXAMPLE 6

A polyadduct of the formula

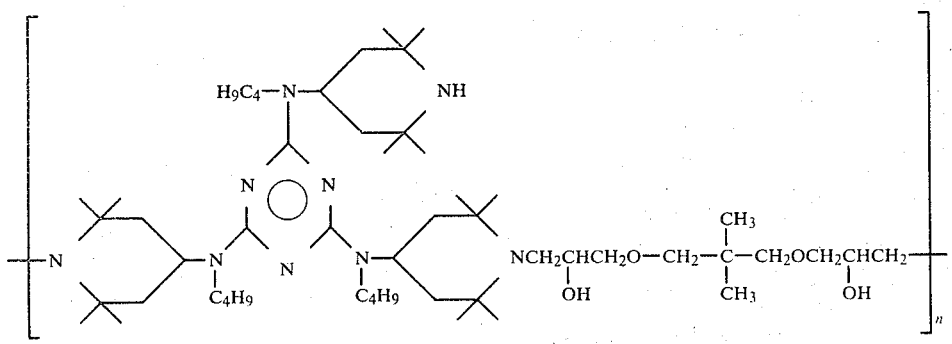

is obtained in the form of a light beige-coloured powder with a softening point of about 85° C. and an average molecular weight of about 2300 by repeating the procedure describing in Example 3, but using 8.6 g of neopentyl glycol diglycidyl ether instead of 8 g of 1,4-butanediol-diglycidyl ether.

EXAMPLE 7

With stirring, 39.2 g of 2-isopropyloxy-4,6-bis-(2',2',6'-6'-tetramethylpiperidinyl-4'-butylamino)-1,3,5-triazine (m.p. 90° C.) and 14.1 g of 1,4-butane-diol-diglycidyl ether are refluxed for 10 hours in a nitrogen atmosphere. The solvent is subsequently removed completely in a water jet vacuum and then in a high vacuum (0.001 torr) at 150° C. The resulting adduct of the formula

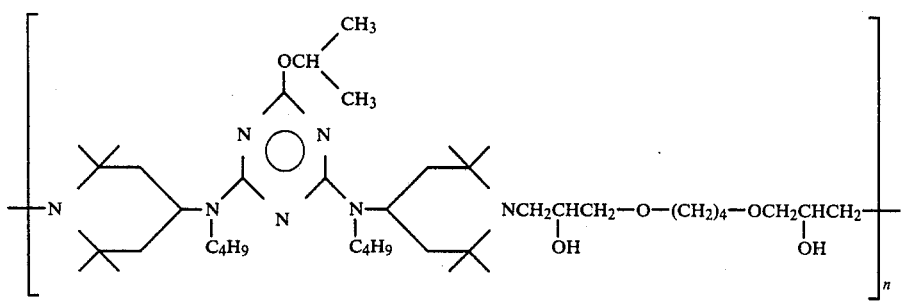

can be comminuted to a colourless powder which has a softening point of about 91° C. and an average molecular weight of about 2700.

EXAMPLE 8

32 g of 2,4,6-tris-(2',2',6',6'-tetramethylpiperidinyl-4'-butylamino)-1,3,5-triazine and 4.5 g of triglycidylisocyanurate are heated under nitrogen to 180° C. and the resulting melt is kept for 8 hours at this temperature. The still warm melt is taken up in 200 ml of toluene. A faintly beige-coloured product precipitates by addition of hexane. The product has a melting point of 210° C. and its main constituent has the structural formula

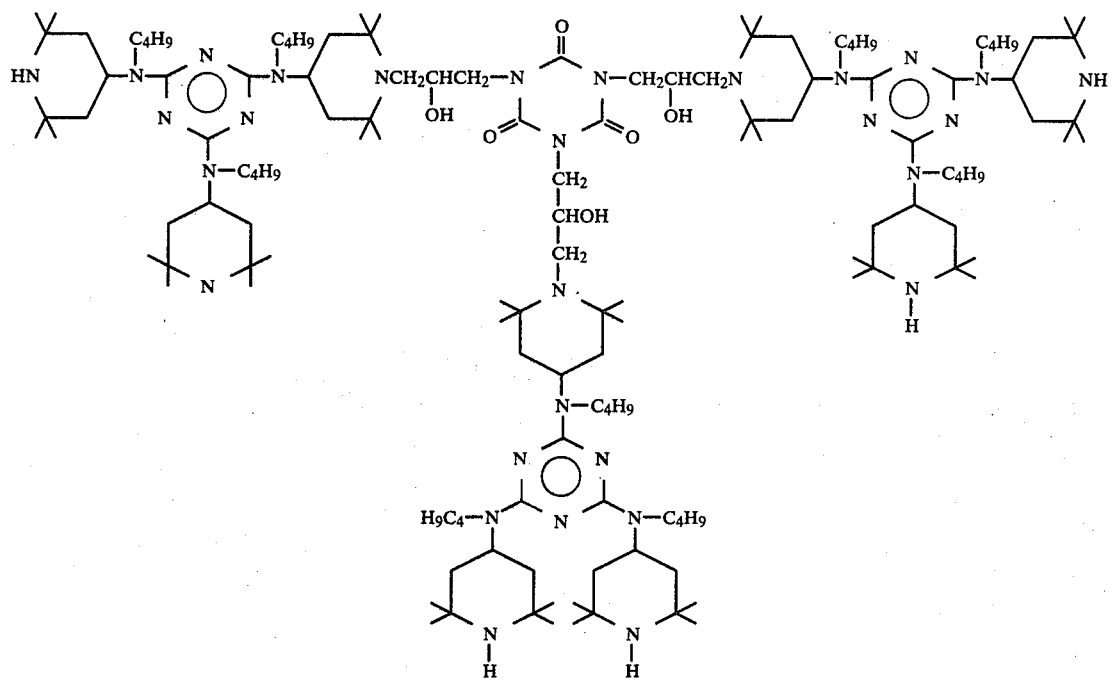

EXAMPLE 9

44.6 g of N,N'-bis[2,4-bis(2,2,6,6-tetramethylpiperidinyl-4-butylamino)-1,3,5-triazin-6-yl]-hexamethylenediamine and 8 g of 1,4-butanediol-diglycidyl ether are stirred in 100 ml of ethylene glycol monobutyl ether at 160° C. for 10 hours under nitrogen. Evaporation of the solvent—finally in a high vacuum (0.001 torr) at 150° C.—yields a brownish resin which can be comminuted to a faintly beige-coloured powder which sinters at about 93° C. The product, which has an average molecular weight of 3200, has the formula

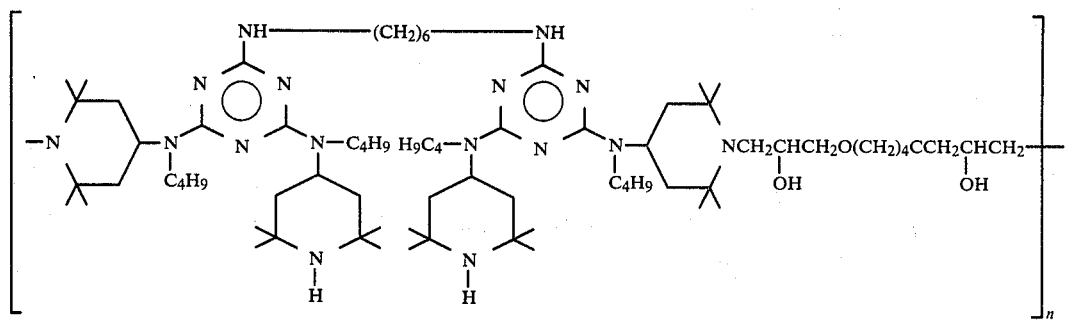

EXAMPLE 10

41.3 g of N,N'-bis[2-diethylamino-4-(2,2,6,6-tetramethylpiperidinyl-4-octylamino)-1,3,5-triazin-6-yl]dodecamethylenediamine and 8.8 g of 1,4-butanediol-diglycidyl ether are stirred in 150 ml of ethylene glycol at 170° C. for 10 hours under nitrogen. After cooling to about 150° C., 300 ml of toluene are added and the solution is washed with 200 ml of water. The toluene is evaporated and the residue is dried at 150° C. for 12 hours in a high vacuum (0.001 torr). The resulting adduct is a brownish viscous resin with an average molecular weight of 2800 and has the formula

EXAMPLE 12

36.9 g of cyanuric chloride are dissolved in 250 ml acetone and the solution is cooled to 5° C. To this solution is dropped a solution of 129.4 g of 2,2,6,6-tetramethyl-4-[2-(2,2,6,6-tetramethylpiperidyl-4)-aminoethyl]-piperidine in 500 ml water within 2 hours keeping the temperature at 5°–10° C. After 30 minutes stirring a solution of 8 g NaOH in 50 ml water is added slowly and the stirring is continued for further 2 hours at a temperature of 35°–40° C. Then a second portion of 8 g NaOH in 50 ml H$_2$O is added and the reaction mixture is stirred at 45°–50° C. for further 6 hours. The white

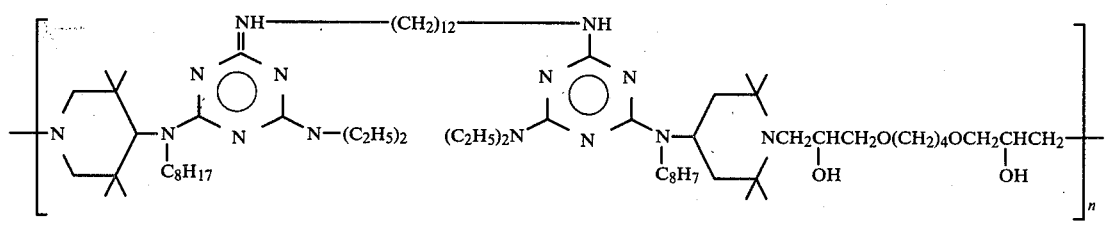

EXAMPLE 11

39.2 g of 2-isopropyloxy-4,6-bis(2',2',6',6'-tetramethylpiperidinyl-4'-butylamino)-1,3,5-triazine and 14.9 g of 1,4-dibromo-2-butene are refluxed for 48 hours in 400 ml of methyl ethyl ketone with 20.7 g of potassium carbonate. After cooling to room temperature, precipitated KCL is filtered off and the methyl ethyl ketone is concentrated in vacuo. The residue is taken up in 300 ml of toluene and the solution is washed with three 100 ml portions of water, dried over sodium sulfate and concentrated in vacuo. The resulting product with a softening point of about 125° C. and an average molecular weight of about 2700 has the formula:

precipitation of 2-chloro-4,6-bis[N-(2,2,6,6-tetramethyl-4-piperidyl)-2-(2,2,6,6-tetramethylpiperidyl-4)-ethylamino]-1,3,5-triazine is filtered off, washed and recrystallized from acetonitrile (mp. 142° C.).

75.8 g of this triazine derivative, 10 g of dodecamethylene diamine and 200 ml of xylene are refluxed for 12 hours. 4 g of finely powdered NaOH are added and the refluxing is continued for further 24 hours. After cooling to room temperature 100 ml of water are added with stirring, the organic layer is separated and washed three times with 100 ml of water. The washed xylene solution is dried over sodium sulfate and the solvent evaporated. The resulting N,N'-Bis{2,4-bis[(2,2,6,6-tetramethyl-4-piperidyl)-2-(2,2,6,6-tetramethyl-piperidyl-4)ethylamino]-1,3,5-triazinyl-6}dodecamethylene diamine melts at 92° C.

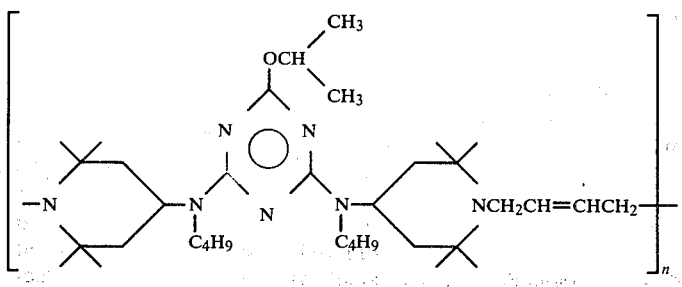

32,8 g of this compound, 4 g of 1,4-butanediol-diglycidyl ether and 100 ml of 2-butoxyethanol are stirred under nitrogen at a temperature of 160° C. for 15 hours. The reaction mixture is poured slowly into 500 ml ice-water. The formed precipitate is filtered, washed with water and dried in vacuo at 50° C. The resulting product is a colourless powder sintering at about 70° C. The average molecular weight is 4600.

What is claimed is:

1. A compound of the formula

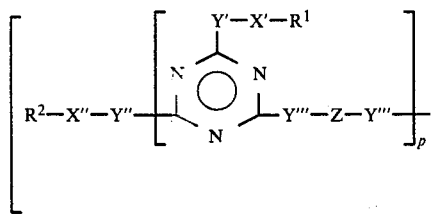

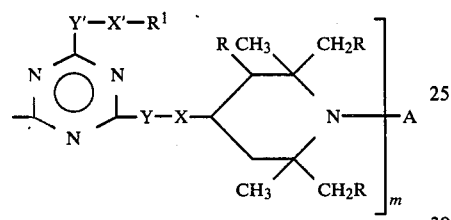

wherein m is 2, 3, or 4, p is 0 or 1, X, X' and X" represent a direct bond, $C_1$–$C_4$ alkylene or —OCH$_2$CH$_2$—, the O of which is not bonded to Y, Y' or Y"; Y, Y', Y" and Y''' represent —O—, —S—, —NH— or —NR$^3$—, Z represents $C_2$–$C_{12}$ alkylene, $C_4$–$C_{20}$ alkylene interrupted by —O—, —S—, —NH— or —NR$^3$—, xylylene, $C_6$–$C_{12}$ arylene or -phenylene-Q'-phenylene-, wherein Q' is —CH$_2$—, >C(CH$_3$)$_2$, —SO$_2$— or —O—, R represents hydrogen or $C_1$–$C_4$ alkyl, R$^1$, R$^2$ and R$^3$ represent $C_1$–$C_{12}$ alkyl, $C_2$–$C_8$ alkoxyalkyl, $C_2$–$C_4$ hydroxyalkyl, $C_5$–$C_{12}$ cycloalkyl, $C_7$–$C_{12}$ aralkyl, $C_3$–$C_{18}$ alkenyl, $C_6$–$C_{10}$ aryl, phenyl which is substituted by (1) one or two $C_1$–$C_8$ alkyl groups, (2) hydroxy, (3) $C_1$–$C_4$ alkoxy, (4) one or two $C_1$–$C_8$ alkyl groups and hydroxy or (5) one or two $C_1$–$C_8$ alkyl groups and $C_1$–$C_4$ alkoxy, or represent a polyalkylpiperidinyl group of the formula

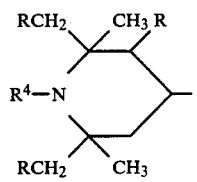

R$^4$ represents hydrogen, O, $C_1$–$C_{12}$ alkyl, allyl or benzyl,

A if m is 2, represents $C_2$–$C_{12}$ alkylene, xylylene or a radical of the formula —CH$_2$—C≡C—CH$_2$—,

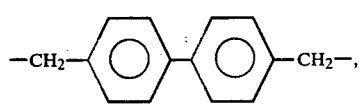

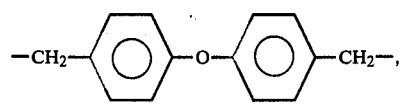

—CH$_2$—COO—R$^5$—OOC—CH$_2$—, —CH$_2$—CH(OH)—CH$_2$— or —CH$_2$CH(OH)CH$_2$—D—CH$_2$CH(OH)CH$_2$—, or if m is 3, represents a group of the formula

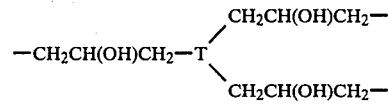

and, if m is 4, represents a group of the formula

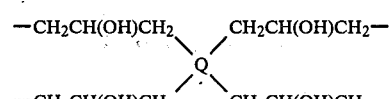

R$^5$ represents $C_2$–$C_8$ alkylene, $C_4$–$C_8$ oxaalkylene or cyclohexylene, D represents a divalent radical of the formula —O—R$^6$—O—, —O—C(O)—R$^7$—C(O)—O—, —OCH(R$^8$)CH$_2$O—R$^6$—OCH$_2$CH(R$^8$)O— or

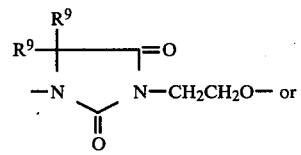

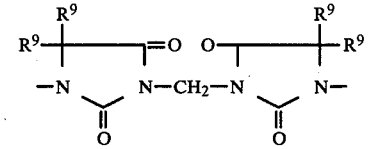

R$^6$ represents $C_2$–$C_{12}$ alkylene, $C_6$–$C_{12}$ cycloalkylene, $C_6$–$C_{12}$ arylene or -phenylene-Z$_1$-phenylene-, wherein Z$_1$ represents —CH$_2$—, >C(CH$_3$)$_2$, —SO$_2$— or —O—, R$^7$ represents a direct bond, $C_1$–$C_{12}$ alkylene or $C_6$–$C_{12}$ arylene, R$^8$ and R$^9$ are hydrogen or $C_1$–$C_4$ alkyl, T represents a trivalent radical of the formulae

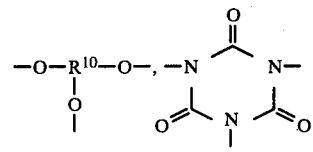

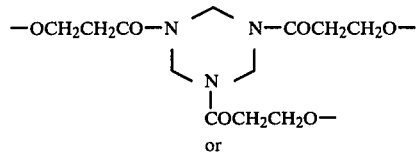

or

-continued

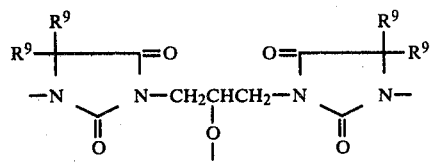

$R^{10}$ represents a trivalent aliphatic hydrocarbon radical of 3 to 10 carbon atoms, Q represents a quadrivalent radical of the formula

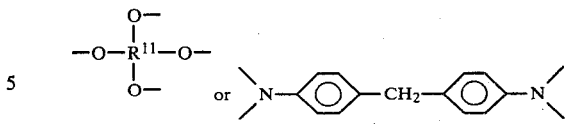

and $R^{11}$ represents a quadrivalent aliphatic hydrocarbon radical of 4 to 10 carbon atoms.

2. A compound according to claim 1 wherein R represents hydrogen.

3. A compound according to claim 2 wherein Y, Y', Y'' and Y''', each independently of the other, represents —NH— or —NR$^3$—.

4. A compound according to claim 1, wherein m is 2 and A represents a radical of the formula —CH$_2$CH(OH)CH$_2$—D—CH$_2$CH(OH)CH$_2$—.

5. A compound according to claim 4, wherein D represents a group —O—R$^6$—O— and R$^6$ represents C$_2$-C$_{12}$ alkylene, C$_6$-C$_{12}$ cycloalkylene, C$_6$-C$_{12}$ arylene or -phenylene-Z$_1$-phenylene-, wherein Z$_1$ represents —CH$_2$—, >C(CH$_3$)$_2$, —SO$_2$— or —O—.

* * * * *